(12) United States Patent
DellaFera et al.

(10) Patent No.: US 8,280,965 B2
(45) Date of Patent: Oct. 2, 2012

(54) METHOD AND SYSTEM FOR MANAGING ELECTRONIC MAIL

(75) Inventors: Ciaran A. DellaFera, Cambridge, MA (US); Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 12/332,038

(22) Filed: Dec. 10, 2008

(65) Prior Publication Data
US 2010/0146059 A1  Jun. 10, 2010

(51) Int. Cl.
*G06F 15/16* (2006.01)
(52) U.S. Cl. ................. 709/206; 709/204; 709/205
(58) Field of Classification Search .............. 709/206
See application file for complete search history.

(56) References Cited

U.S. PATENT DOCUMENTS

| | | | |
|---|---|---|---|
| 6,052,709 A * | 4/2000 | Paul ............................. 709/202 |
| 6,249,807 B1 | 6/2001 | Shaw et al. |
| 6,453,327 B1 * | 9/2002 | Nielsen .......................... 715/205 |
| 6,684,238 B1 | 1/2004 | Dutta |
| 6,725,228 B1 * | 4/2004 | Clark et al. ........................... 1/1 |
| 7,624,146 B1 * | 11/2009 | Brogne et al. ................. 709/206 |
| 7,693,944 B2 * | 4/2010 | Appelman et al. ............. 709/206 |
| 7,783,715 B2 * | 8/2010 | Muller ........................... 709/206 |
| 2002/0023136 A1 * | 2/2002 | Silver et al. .................... 709/206 |
| 2002/0099681 A1 | 7/2002 | Gainey et al. |
| 2002/0147778 A1 * | 10/2002 | Dutta ............................ 709/206 |
| 2003/0014490 A1 * | 1/2003 | Bates et al. .................... 709/206 |
| 2003/0023692 A1 * | 1/2003 | Moroo ........................... 709/206 |
| 2004/0114735 A1 * | 6/2004 | Arning et al. ............... 379/93.24 |
| 2004/0249896 A1 * | 12/2004 | Watanabe et al. ............. 709/206 |
| 2005/0132010 A1 * | 6/2005 | Muller ........................... 709/206 |
| 2005/0228864 A1 * | 10/2005 | Robertson ..................... 709/206 |
| 2005/0267937 A1 * | 12/2005 | Daniels et al. ................ 709/206 |
| 2006/0010213 A1 | 1/2006 | Mehta |
| 2007/0038717 A1 | 2/2007 | Burkholder et al. |
| 2007/0061401 A1 | 3/2007 | Bodin et al. |
| 2007/0238474 A1 * | 10/2007 | Ballas et al. .................. 455/466 |
| 2008/0104175 A1 | 5/2008 | Keohane et al. |

OTHER PUBLICATIONS

IBM, Method to Detect Out of Office Agent Activation in Email, Nov. 19, 2004, http://www.ip.com/pubview/IPCOM000032962D.

* cited by examiner

*Primary Examiner* — Kenny Lin
*Assistant Examiner* — Shaq Taha
(74) *Attorney, Agent, or Firm* — George R. McGuire; David B. Woycechowsky; Bond Schoeneck & King

(57) ABSTRACT

A method and system for managing email between a sender and a recipient wherein the method and system provide the recipient with control over routing an email message, wherein the control includes predefining directions to be executed upon the receipt of an email message, and wherein the directions are dependent upon the properties of the email message. The recipient may enable or disable the control at any time.

3 Claims, 5 Drawing Sheets

METHOD AND SYSTEM FOR MANAGING ELECTRONIC MAIL

FIELD OF INVENTION

The present invention relates generally to computer systems and in particular to electronic mail (email) functions in computer systems. More particularly, the present invention relates to the management of email.

BACKGROUND

Electronic mail, often abbreviated to e-mail, email, or originally eMail, is a store-and-forward method of writing, sending, receiving and saving messages over electronic communication systems. The term "e-mail" applies to the Internet email system based on the Simple Mail Transfer Protocol, to network systems based on other protocols and to various mainframe, minicomputer, or internet by a particular systems vendor, or on the same protocols used on public networks.

Email is a widely utilized communication tool in the computer network environment. Email is an especially critical business tool for communication in large, geographically-distributed organizations. These large organizations are frequently challenged with keeping track of personnel who are available to work or respond to issues as the issues arise. These issues are oftentimes communicated from one person to the other within the organization via email and the recipient of the email is then expected to respond to or resolve the issue.

To help email senders know which email receivers are available to work or to respond to issues sent via email, most email systems contain an "out-of-office" notification function. This function alerts an email sender if the recipient is not going to be checking email for a specific period of time, perhaps due to an illness or a vacation, and often includes a return date or end date. Sending email to a recipient who has enabled the out-of-office notification function triggers a return from the recipient's email system of a designated email message/notification to the sender. This notification allows the sender to take other action. For example, if the sender's email contains time sensitive information that must be handled before the recipient's return date, the sender is able to re-route the request to another person within the organization.

With the present out of office notification function, the sender often does not remember the recipient's return date or may not be given a return date, and the sender may periodically send an email to the recipient, only to receive a new out of office notification. This is particularly true when a recipient has set the out-of-office function for an extended period of time. If the sender has time-sensitive communication that must be addressed and there is a second or backup person (other then the out-of-office recipient) who is capable of responding to the sender's email request, the sender may lose valuable time through the redundant actions of resending and repeatedly receiving multiple out-of-office notifications before taking appropriate action.

Moreover, email recipients experience overflow of mail in their mailboxes with unread email after a few days of the out-of-office function being used, with limited or no access to their email. Very few prior art methods focus on management of mailboxes with the objective of reducing the amount of emails filling up the recipient's mailbox. Most prior art email management solutions focus on archiving and redistribution of incoming emails and result in producing more emails or copies of emails, not fewer.

An example of one prior art email retraction system, set forth in U.S. Publication No. US20050223064, which is hereby incorporated by reference, which provides the sender the option of retracting a message. This retraction can occur locally before it is sent as well as at the server side, but it is based on the decision of the sender, only.

There remains a need to provide recipients of emails with methods and systems to control the build-up or excess of email in one's mailbox.

SUMMARY

According to one embodiment of the present invention, a method of a method for managing email between a sender and a recipient is provided wherein the method provides the recipient with control over routing an email message, wherein the control comprises predefining directions to be executed upon the receipt of an email message, and wherein the directions are dependent upon the properties of the email message. The recipient may enable or disable the control at any time.

In a further aspect of the method, the properties of the email message may include the recipient's position in the addressee fields, a word or words in the subject field, and/or whether the recipient is the sole receiver of the email or is one or many receivers of the email. The addressee fields may include the "To:," "Cc:," and "Bcc:" fields. The word or words in the subject field include(s) a word or words that match(es) a word or words preselected by the recipient, such as, but not limited to, "urgent," "confidential," or "fyi."

In another aspect of the method, the directions include providing one or more options to the sender of the email, such as: (a) allowing the sender to send the email message; (b) allowing the sender to retract the email message; (c) allowing the sender to forward the email message to a different media predefined by the recipient; and/or (d) allowing the sender to forward the email message to a second recipient.

Examples of different media include, but are not limited to, a private email address, short message service (SMS), voice mail, or virtual private network (VPN). The directions may be executed upon receipt of the email message at the recipient's email server.

In yet another aspect, the method may further include the recipient sending an out-of-office message to the sender.

In another embodiment of the present invention, a system for managing email between a sender and a recipient is provided including at least one server for sending and receiving email, wherein the server is structured and programmed to provide the recipient with control over routing an email message, wherein the control comprises predefining directions to be executed upon the receipt of an email message, and wherein the directions are dependent upon the properties of the email message.

In a further aspect of the system, the server is structured and programmed to define the properties to include the recipient's position in the addressee fields, a word or words in the subject field that match(es) a word or words preselected by the recipient, such as "urgent," "confidential," or "fyi," and/or whether the recipient is the sole receiver of the email or is one or many receivers of the email. The addressee fields can include "To:," "Cc:," and/or "Bcc:".

In another aspect of the system, the server is structured and programmed to provide one or more options to the sender of the email, whereby the options can include: (a) allowing the sender to send the email message; (b) allowing the sender to retract the email message; (c) allowing the sender to forward the email message to a different media predefined by the recipient; and/or (d) allowing the sender to forward the email message to a second recipient.

In yet another embodiment of the present invention, a computer program product is encoded in a computer readable medium for instructing a system to manage email between a sender and a recipient. The program is code configured to cause the computer to perform the method including providing the recipient with control over routing an email message. The control comprises predefining directions to be executed upon the receipt of an email message, and the directions are dependent upon the properties of the email message.

In another aspect of the computer program product, the properties of the email message can include recipient's position in the addressee fields or a word or words in the subject field of the email message. These addressee fields include "To:," "Cc:," and/or "Bcc." For example, when a word or words in the subject field are used as the determinative email properties, then the word or words will be checked for a match against a word or words preselected by the recipient.

In yet a further aspect of the computer program product, the directions can include providing one or more options to the sender of the email, such as: (a) allowing the sender to send the email message; (b) allowing the sender to retract the email message; (c) allowing the sender to forward the email message to a different media predefined by the recipient; and/or (d) allowing the sender to forward the email message to a second recipient.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Embodiments of the invention provide a system and method for managing and routing of email, whereby the managing and routing are controlled by the recipient, not the sender of the email. More specifically, the embodiments herein are directed to an out-of-office function that enables retraction of email based on decisions made by the recipient of the email. Accordingly, if the recipient decides that the sender should be given the option of retracting a message due to the recipient being away on a business or recreational trip, the recipient defines actions and/or functions to be executed.

The out-of-office function is enabled by a user when the user expects to be away from the office or is otherwise not expected to be able to access his email. The out-of-office function is governed by a series of decision tables that are activated by the user, typically through a web-based interface. By activating the decision tables, a user defines the actions or functions to be executed upon the happening of certain conditions, e.g., the user defines the recipient as, for example, a "single" addresses or "one of many" addressees in the "To:" field.

Figure 1:
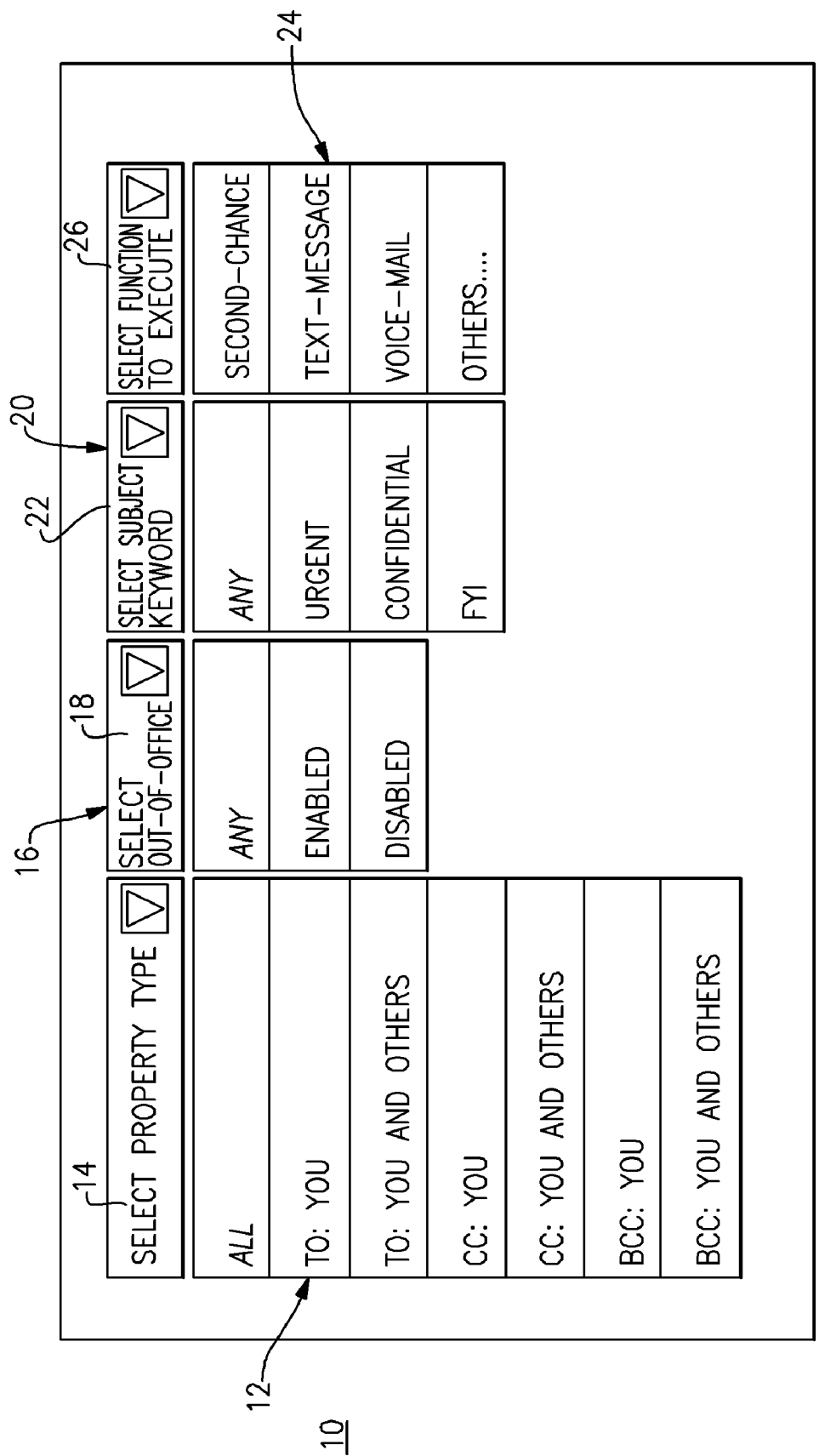
FIG. 1 shows a sample web-page with multiple choice/pull down selection menu to build decision tables of a system embodiment herein.

To further explain this function, reference is made to FIG. 1, which displays a sample web page 10 showing a multiple choice pull-down selection menu for building decision tables. The user of the embodiments of the method and system herein, must select from the options listed in web page 10 in order to define the actions, which will be carried out upon receipt of an email. It should be mentioned that web page 10 is one example of many, and does not limit the options that may used to build decision tables.

The first column 12 of web page 10 provides a list of options for selecting the property type as indicated by the "Select Property Type" heading 14 of column 12. The property types include the "To:", "Cc:", and "Bcc" fields. The addressee must also be selected from the following options: "you," whereby you alone are the recipient, or "you and others," whereby you are among two or more recipients. The field and whether the addressee is solely "you" or "you and others" may indicate the importance or significance of the message. For example, if an email is addressed to "you" in the "To:" field, in comparison to one that is addressed to "you" in the "Ccc:" or "Bcc:" fields, the first email message may be more significant or important to the recipient than the second email message, since in the first email, the primary and only addressee is the user/recipient, and in the second email message, the user/recipient is "copied" or "blind copied." Therefore, the placement ("To" or "Copied") of the recipient in the email and the number of addressees in the email ("you" or "you and others") will determine the decision or action that the user/recipient of the out-of-office function will take. The user of this out-of-office function can select one or more fields shown in column 12, or select all the fields by selecting the "ALL" option.

The next column, column 16, of web page 10 of FIG. 1, provides a list of options for selecting the out-of-office function as indicated by the "Select Out-of-Office" heading 18 of column 16. The options include "enabled," "disabled," or "ANY," which mean that the decision tables used in the out-of-office function can be utilized at anytime, when out-of-office is enabled or disabled. This allows the user to control delivery and routing of email messages even if he is in the office. For instance, if the user is in the office, but is not located near his email interface, he has the option to select "ANY" and get rerouting of emails to a device to which he has easy access. Additionally, even if the user is sitting at his desk using his computer, he may want to filter emails that are not as urgent and receive only urgent emails. Thus, he can select the "ALL" option, not enabling or disabling the out-of-office function, but redirecting less urgent emails to another media or address, e.g., another email address, to view at a later time, when he has more time. In this way, he is not interrupted every time a new email is incoming.

Adjacent to column 16 is column 20 of web page 10. Column 20 provides a list of subject keywords as indicated by the "Select Subject Keyword" heading 22. The options include "urgent," "confidential," "fyi," or "ANY." The user will most likely route emails to a service to which he has immediate access if the subject line of the email has the word "urgent" in contrast to an email that has the word "fyi" in the subject line. These select keywords are mere examples, not limiting the embodiments to only these examples. The user may select any words he would like to match in the subject line of the incoming email, and redirect the email based on any word he has selected to be in the subject line.

The final column of web page 10 is column 24, with the heading 26, "Select Function to Execute." The options under column 24 include but are not limited to, "second-chance," "text-message," and "voice-mail." Again, these options are examples and do limit the embodiments herein to these select functions. If the user selects the "second-chance" function, the sender is provided with the option to retract the email that was sent to the user/recipient. If the user selects the "text-message" function, the sender may send the email as a text-message to the user/recipient. Similarly, the "voice-mail" function allows the sender to send a voice-mail regarding the email contents to the user/recipient, if this option is selected by the user/recipient.

For each of the functions displayed in web page 10, the user may select more than one option under each heading, or may select all options by selecting the "ALL" option under any or all headings. Although column 24 does not list an "ALL" option, it is possible that the user may select any or all options, if he has access to each and every application.

When combining more than one function, a decision table will need to be established for each selection criteria that is based on specific email property types of the email, such as "urgent" or "confidential" and in which field the user/recipient's address is entered, such as "To:" or "Cc:." The following Table 1 sets forth possible property types and the meaning of the property types. The properties are not limited to these attributes, but they will be typically used by most users.

availability. If the sender decides not to post the message, it will be marked as deleted in the recipient's server mailbox by the Mail Transfer Agent (MTA) or mail server and the recipient will not be "bothered" about this email when he or she returns.

Figure 3:
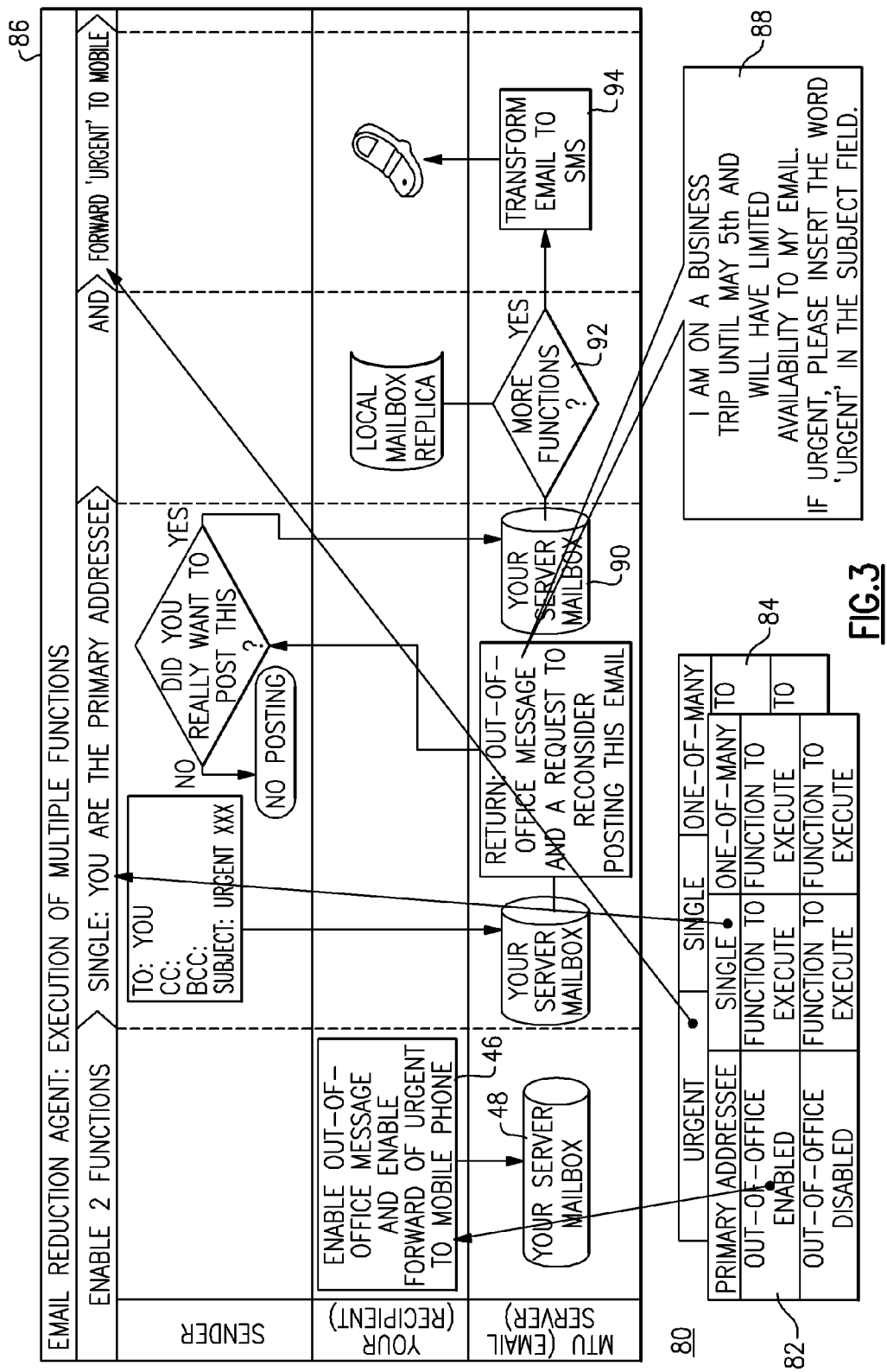
FIG. 3 shows the execution of a function of a method embodiment herein.

FIG. 3 illustrates another possible scenario 80 showing multiple functions being executed. Decision tables 82 and 84 are activated and the functions are executed as shown in execution table 86. Decision table 82 ("primary addressee table") executes the "second-chance" function as described in the first scenario above. The out-of-office message 88 by the user/recipient states that if the email is "urgent," the sender should insert the word "urgent" into the subject line. In this example, the sender inserts "urgent" in the subject field, and decision table 84 ("urgent table") is activated. The email message goes to the user/recipient's server mailbox at 90 and due to the word "urgent," the query at step 92 asking whether there are more functions is answered with a yes and decision table ("urgent table") 84 executes the "text message" function at step 94 by transforming the email and sending an SMS text message to the user/recipient's mobile phone. In this sce-

TABLE 1

| | | |
|---|---|---|
| 1 | To: You | Ordinary email addressed to a single recipient |
| 2 | To: You and others | Ordinary email addressed to a recipient in a group |
| 3 | Cc: You | Ordinary email addressed to a single recipient as a copy |
| 4 | Cc: You and others | Ordinary email addressed to a recipient in a group as a copy |
| 5 | Bcc: You | Ordinary email addressed to a single recipient as an undisclosed copy |
| 6 | Bcc: You and others | Ordinary email addressed to a recipient in a group as an undisclosed copy |
| 7 | Urgent | An email addressed to the recipient in the form 1-6 and marked with "Urgent" in the Subject-field |
| 8 | Confidential | An email addressed to the recipient in the form 1-6 and marked with "Confidential" in the Subject-field |
| 9 | FYI | An email addressed the to recipient in the form 1-6 and marked with "FYI" in the Subject-field |

Figure 2:
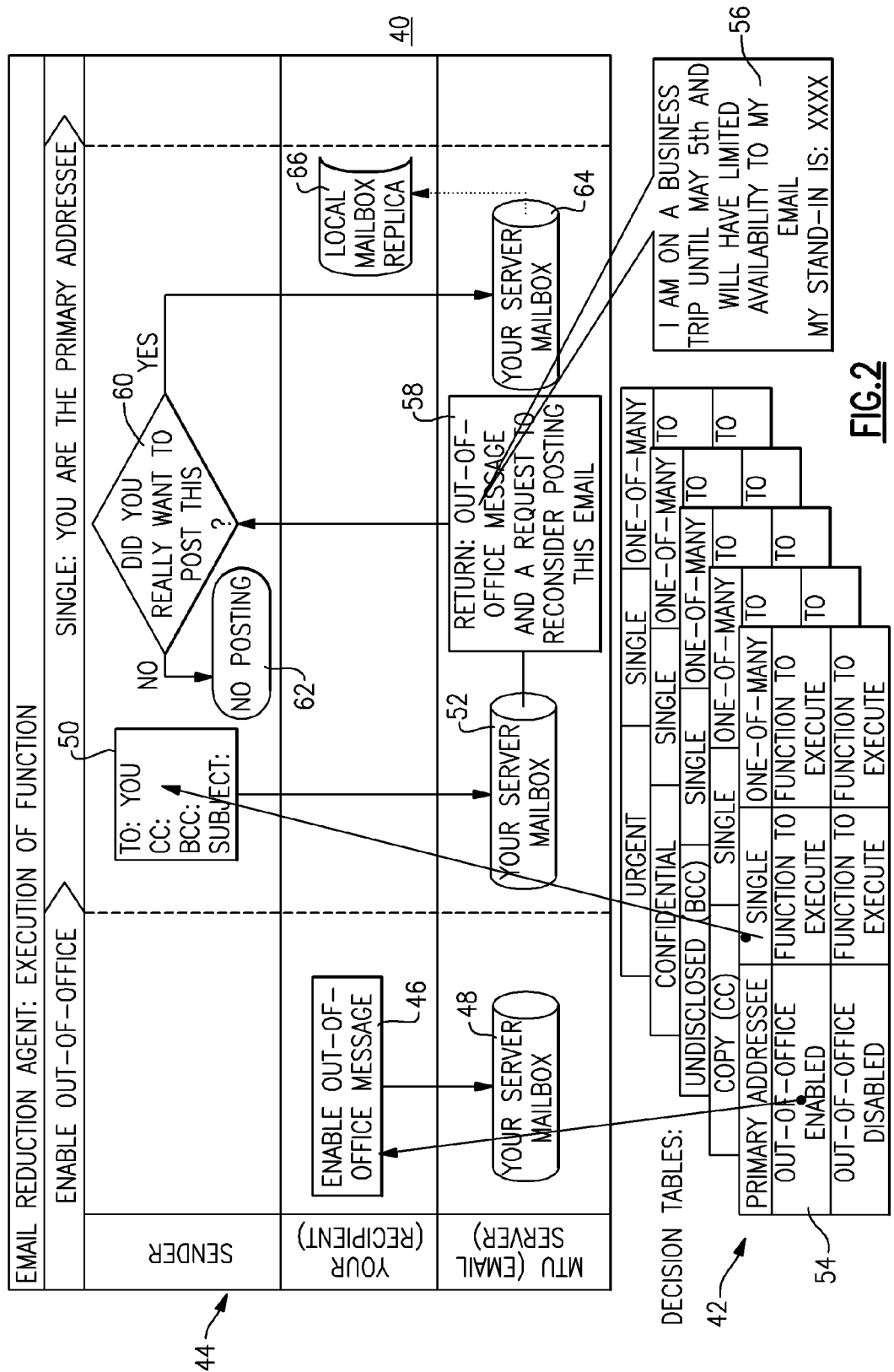
FIG. 2 shows the execution of a function of a method embodiment herein.

Web page 10 allows the user/recipient to select those functions that will allow the user to activate the out-of-office application. Web page 10 activates a set of decision tables based on the various options selected, when an email is received. FIG. 2 illustrates a possible scenario 40 in which the user/recipient has selected the "second-chance" function using the out-of-office utility. Scenario 40 includes a set of decision tables 42, which drive the logic of the out-of-office application and an execution table 44, which displays the execution of the application. As shown in table 44, the out-of-office application is enabled by the user as shown at step 46 and implemented at the server mailbox at 48. When an email is sent from a sender at step 50 to the user at step 52, and is addressed to the user/recipient as the primary addressee and also as the only addressee, decision table 54 is activated. Decision table 54 executes the "second-chance" function. A message from the user/recipient is shown at 56 and states his limited availability to his email. At step 58, the sender receives the out-of-office message and a request to reconsider the posting of the email. At step 60, the system queries whether or not the sender wants to post the email. If the sender answers no, the email is not posted as shown at step 62. If the sender answers yes, the email is sent to the server email at step 64 and forwarded onto the user's local mailbox at step 66. In this scenario, the sender is allowed to get a "second chance" on whether he wishes to retract the email or have it sent to the recipient's email. After the out-of-office message has been sent from the recipient, the "second chance" function will pick up the email from the recipient's mailbox and redirect it back to the sender with the option of NOT posting the message into the recipient's mailbox due to the recipient's limited nario, the user/recipient controlled the routing of the message to his cell phone by requesting the sender to insert the word "urgent" in the subject line.

The decision tables and scenarios just described in no way limit the embodiments herein. For example, the embodiments include a method and system using generic decision tables related to specific properties of an email such as, the recipient is alone on the Copy-list or one of many, the recipient is alone on the undisclosure list or one of many, etc. Moreover, users can establish multiple functions utilizing different channels or media, such as, forwarding to a private email address that is enabled for reading email over a VPN or through a secure web-based email client, forwarding to a different person if it is urgent, forwarding the message to a text message over SMS or transforming the message to voice mail. The flexibility offered herein is provided by the use of decision tables, which can be used individually or in combinations.

Figure 4:
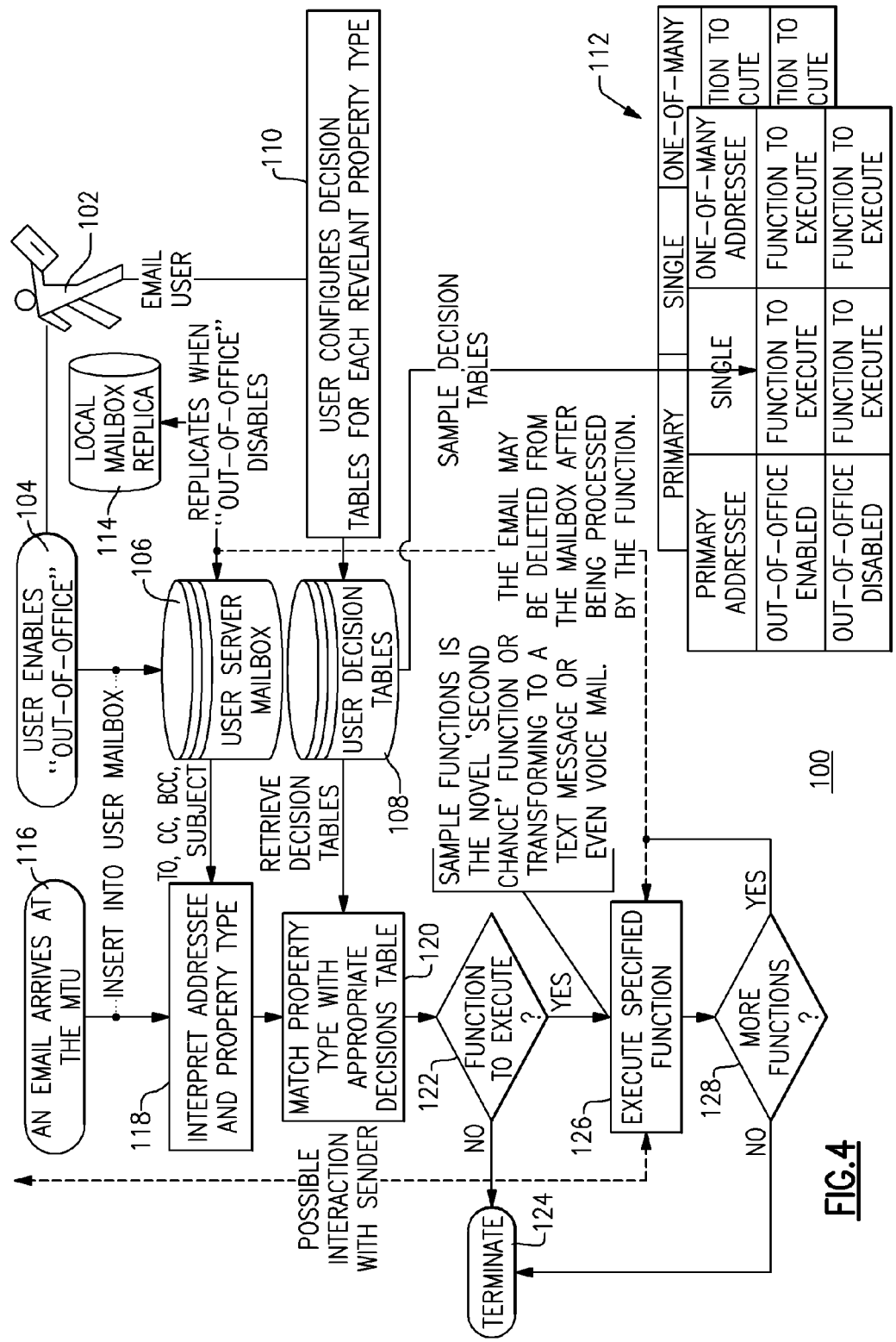
FIG. 4 shows the logic of a method embodiment herein.

Reference is made to FIG. 4, which displays the logic 100 of method and system embodiments of the invention. The configuration of the out-of-office function is shown on the right side of the drawing, which begins with email user 102 at step 104, enabling the out-of-office function at the user server mailbox 106. As discussed above, the decision tables 108 are configured by user 102 at step 110. Sample decision tables are also shown at 112. The user's server mailbox is replicated at a local mailbox 114.

The execution of the out-of-office function is shown on the left side of the drawing, which begins with an email arriving at the email server, also known as a mail transfer agent (MTA) at step 116. The following step, 118, interprets the addressee and property type, i.e., is the email addressed solely to the user 102 or to the user 102 and others, and in which field (To, Cc, Bcc) is the user placed. At step 120, the property type is matched with the appropriate decision table from the series of decision tables 108, created by user 102. The system queries whether there is a function to execute at step 122. If the answer is no, the process terminates at step 124. If the answer is yes, the process executes the specific function at step 126. The system further queries at step 128 whether there are more functions to execute. If the answer is no, the process terminates at step 124. If the answer is yes, the process executes the specific function. The process continues until there are no longer any more functions to execute.

The embodiments herein provide a variety of options that not only allow a user the immediate delivery of an urgent or important message, when the user is out of the office, but also allows a reduction of build-up or overflow of email in the user's mailbox, when the user is either in or out of the office. Furthermore, the out-of-office function can be used when a user is in the office and has similar needs, e.g., he is not in close access to his email, such as in part of the building not near his office, or he wants to reduce incoming email until a later time.

Figure 5:
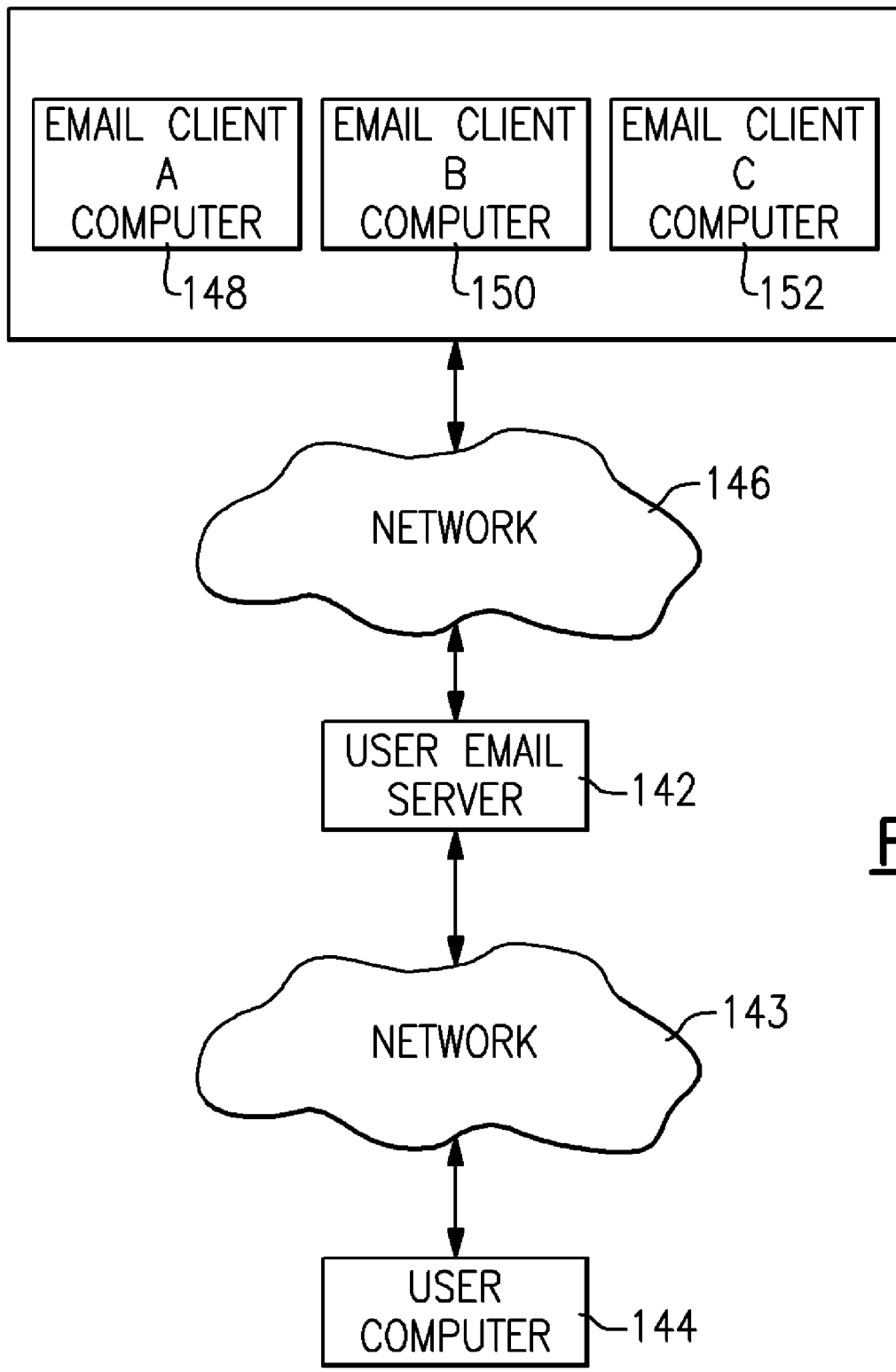
FIG. 5 shows a system embodiment herein.

Reference is made to FIG. 5, which shows system 140. System 140 can include an email server 142 linked to a network 143, such as the internet or an intranet, which is linked to user computer 144. The functions to be executed based on the decision tables are preferably performed at email server 142. A network 146, such as an internet or intranet, links to the email server 142 and to a series of email clients 148, 150, 152, which number is by no means limited hereto.

The system depicted in FIG. 5 is not meant to imply architectural limitations with respect to the embodiments herein. The system herein is fully applicable to hand held devices, such as Blackberry devices, cell phones, personal digital assistants, and other types of devices/machines that support email communication.

Embodiments herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to provide the recipient with control over routing an email message, code to predefine directions to be executed upon the receipt of an email message, code to execute directions based upon the properties of the email message, code to provide directions to a sender of email; code to transfer the email to a different media.

The embodiments herein provide control of incoming emails to a recipient based on decisions made by the recipient. The sender of an email is given a "second chance" to reconsider sending an email to a recipient who is unavailable for a certain period of time due to business travel or vacation. The amount of messages in a recipients mailbox can be reduced by the methods and systems herein.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for managing email, the method comprising the following steps:
setting, by an email recipient, a set of predefined direction(s) comprising at least a first condition and a first response associated with the first condition;
after the setting step, receiving an email communication, from a sender, in an inbox of the recipient's email account, with the email communication having email properties associated with it; and
selectively performing the first response only if the email properties of the email received at the receiving step meet the first condition;
wherein the first condition is one of the following conditions: (i) the recipient's email address is in a predetermined addressee field of the email communication, and (ii) the recipient is a sole receiver of the email communication;
wherein the first response is one of the following: (i) pick up the email from A recipient's server mailbox and back to the sender with the option of not posting the email into the recipient's server mailbox; (ii) allow the sender a chance to send a text message to the recipient, and (iii) allow the sender to send a voice mail to the recipient.

2. A non-transitory computer program product encoded in a tangible computer readable medium, the program code configured to cause the computer to perform the method comprising:
setting, by an email recipient, recipient contact option to be applied to the recipient's email account;
after the setting step, receiving an email communication, from a sender, in an inbox of the recipient's email account; and
processing the email communication received at the receiving step by applying the recipient contact option;
wherein the recipient contact option is programmed to perform one of the following actions: (i) allowing sender to send a text message to the recipient over a text messaging system; or (ii) allowing the sender to send a voice mail to the recipient over a telephone system.

3. The non-transitory computer program product of claim 2 wherein the computer readable medium is in the form of one of the following: a disk; a random access memory; a read-only memory; and a compact disk.

\* \* \* \* \*